No. 770,101. Patented September 13, 1904.

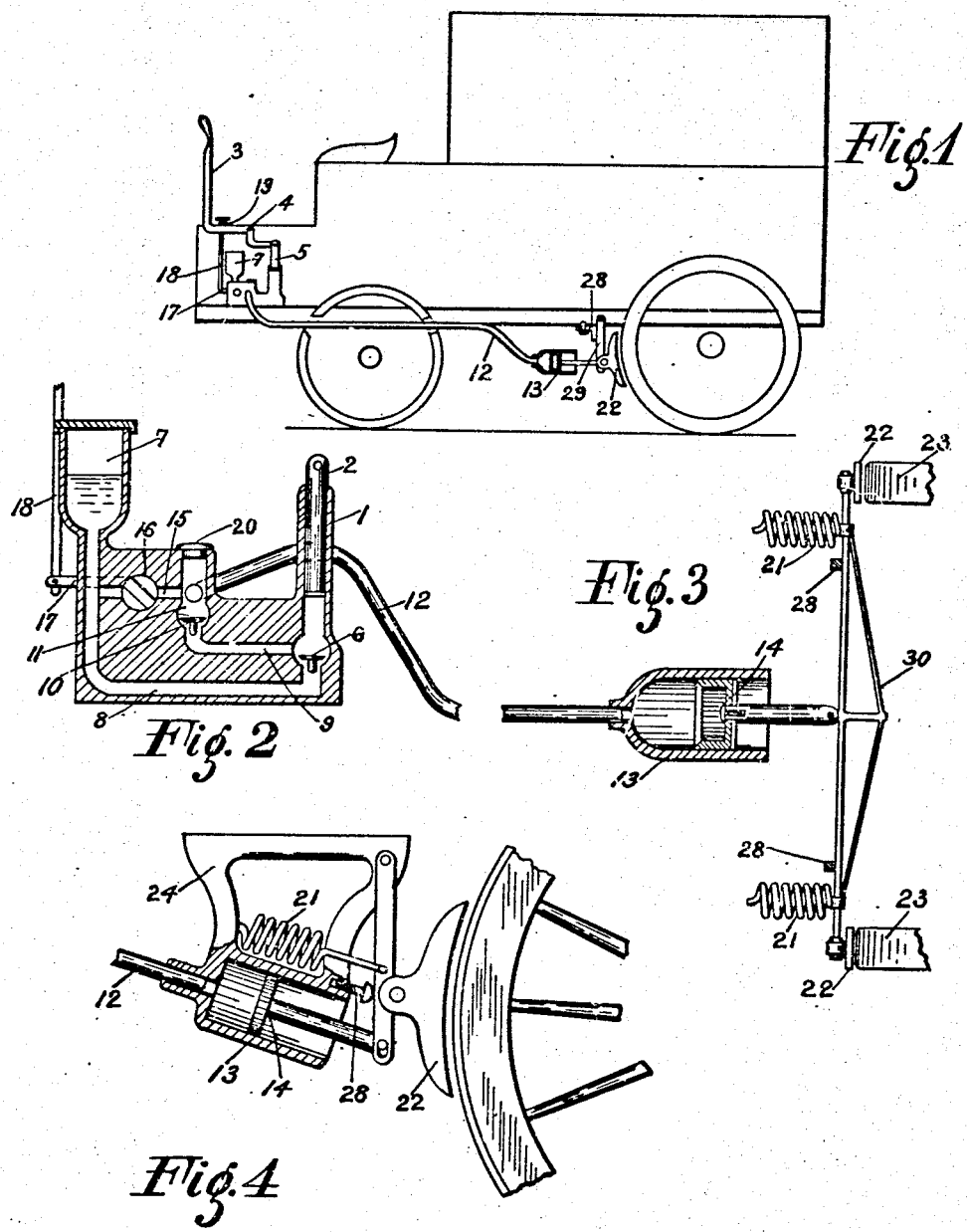

UNITED STATES PATENT OFFICE.

LARS G. NILSON, OF NEW YORK, N. Y., ASSIGNOR OF TWO-THIRDS TO SIEGFRIED M. FISCHER AND HARRY S. FISCHER, OF NEW YORK, N. Y.

VEHICLE-BRAKE.

SPECIFICATION forming part of Letters Patent No. 770,101, dated September 13 1904.

Application filed April 15, 1903. Renewed June 30, 1904. Serial No. 214,727. (No model.)

*To all whom it may concern:*

Be it known that I, LARS G. NILSON, a citizen of the United States, residing at New York city, in the county of New York and State of New York, have invented certain new and useful Improvements in Vehicle-Brakes, of which the following is a full, clear, and exact specification.

This invention relates to improvements in vehicle-brakes, and has for its object to provide a brake which shall be quick, powerful, and reliable and simple in construction, so that it will not easily get out of order.

In certain classes of vehicles, more especially in automobiles, where the distance between the operator and the driving-wheels is great and where the space between the wheels is occupied by apparatus of various kinds, it becomes very difficult to apply the ordinary brake. Such a brake is also inefficient and when applied to heavy trucks, omnibuses, &c., incapable of acting with sufficient rapidity and power in case of emergency. Such brakes also become inefficient with wear and continually need adjustment. To overcome these difficulties, I have constructed a fluid-pressure brake controlled from the driver's seat. By dispensing with levers, links, &c., the brakes can be located in the most advantageous position both with reference to the wheels and to the driver. By the use of a hydraulic brake the power can be proportioned to the size of the vehicle by varying the ratio between the cylinders, and at the same time much weight and mechanism are saved.

Referring to the drawings, Figure 1 shows the brake applied to an automobile delivery-wagon. Fig. 2 is a detail showing the pump-cylinder and reservoir detached. Fig. 3 is a plan showing the brake-cylinder connected with a brake-beam. Fig. 4 shows a modification in which each brake-shoe is controlled by a separate cylinder.

1 represents a cylinder containing the piston 2. The piston 2 is connected by a link 5 with a lever 3, pivoted at 4 on the body of the vehicle. The lever 3 is bent so as to rest close to the dashboard to be out of the way and also to permit the pump to be located under the platform. At the bottom of cylinder 1 is a check-valve 6, opening upward and connected with a reservoir 7 by a pipe 8. From the lower portion of the cylinder 1 a passage 9 leads through a check-valve 10 to a chamber 11. From the chamber 11 a passage 12 leads to a brake-cylinder 13. From the chamber 11 another passage 15 leads to the reservoir 7. The passage 15 contains a valve 16, which is normally shut, but can be opened by the operator to release the brakes.

17 is a lever attached to the valve-stem and connected with a rod 18, which may be depressed by the foot of the operator.

19 is a spring tending normally to lift the rod 18 and hold the valve shut.

20 is a detachable cap permitting access to the chamber 11.

The brake-cylinder 13 carries a piston 14, which actuates the brake-beam 30 to apply the brake-shoes 22 to the wheels 23. The brake-beam may be carried in any suitable manner, as by links 29 in Fig 1.

21 represents springs attached to the body, which retract the brake-shoes and the piston when the valve 16 is opened by the operator to permit the fluid to flow back to the reservoir.

In Fig. 4 two brake-cylinders are used. Each cylinder connects with the passage 12 and is carried by a bracket 24, attached to the body or to the truck. The brake-shoe 26 is carried by a link 27, which is pivoted on the bracket 24. The springs 21 hold the brake-shoes retracted.

When it is desired to apply the brake, the operator takes a few strokes with the lever 3. The fluid, preferably oil, is pumped from the reservoir through check-valve 6 on the upstroke of the piston 2. On the downstroke the valve 6 closes and the fluid is forced through valve 10 to the brake-cylinder 13 and applies the brakes. The pressure in the brake-cylinder depends upon the ratio between the pistons 2 and 14. The valve 16 releases the brakes by permitting the fluid to flow back into the reservoir, the springs 21 helping to expel the fluid. Thus the same fluid is used over and over without waste. The valve 10 prevents the fluid from flowing back into the pump-cylinder, and the brakes are held set automatically until the valve 16 is opened by the operator. The pressure of the brake can be regulated by the operator by manipulating the valve 16.

With the form shown in Fig. 4 it will be seen that the pressure on the brake-shoes will always be equalized, irrespective of their distance from the wheels, because one cylinder cannot exert more pressure than the other. 28 is an adjustable stop by which the retraction of the brake can be regulated. The distance of the brake-shoe from the wheel determines the number of strokes necessary to apply the brake. By adjusting the stops 28 the brake-shoes can be put so near the wheels that two or three strokes of the piston 2 will apply the brakes, as the brake-cylinder will always be partially filled with fluid.

I do not restrict myself to the specific construction which I have illustrated, but reserve the right to use modifications and equivalents within the scope of the invention.

The invention is also applicable to other types of brakes than that I have illustrated, and I do not desire to be limited to any particular form of brake.

Having thus described my invention, I declare that what I claim as new, and desire to secure by Letters Patent, is—

1. In a vehicle-brake, a lever pivoted on the body, a pump connected with said lever, a reservoir supplying said pump, a brake-cylinder, brake mechanism actuated thereby, a valve between the pump and the reservoir, a second valve between the pump and the brake-cylinder, and a manually-controlled valve between the brake-cylinder and the reservoir, substantially as described.

2. In a vehicle-brake, a bracket carrying a brake-cylinder, a link pivoted to said bracket carrying a brake-shoe, a spring attached to said link and to said bracket and a connection between said link and the piston of the brake-cylinder, substantially as described.

3. In a vehicle-brake, the combination with a body, of a lever pivoted thereon and bent to rest close to the platform, a pump connected with said lever, brake mechanism actuated by said pump and means controlled by the operator for releasing said brake mechanism, substantially as described.

4. In a vehicle-brake, the combination with a body, of a lever pivoted thereon and bent to rest close to the platform, a pump located below the platform and connected with said lever, the lever being bent between the pivot and the connection with the pump, brake mechanism actuated by said pump, and means controlled by the operator for releasing said brake mechanism, substantially as described.

5. In a vehicle-brake, the combination with a pump, of a supply-reservoir therefor, a brake-cylinder directly connected with said pump, means for actuating the pump to apply the brake, a valve preventing flow from the brake-cylinder to the pump, a valve preventing flow from the pump to the reservoir, a pivoted releasing-valve to permit the brake-cylinder to exhaust into the reservoir, and connections controlled by the operator for operating said valve to release the brake, substantially as described.

6. In a vehicle-brake, a lever pivoted on the body, a pump connected with said lever, a reservoir supplying said pump, a brake-cylinder and brake mechanism actuated thereby, a valve between the pump and the reservoir, a second valve between the pump and the brake-cylinder, and a valve controlled by the foot of the operator between the brake-cylinder and the reservoir, substantially as described.

7. In a vehicle-brake, a lever pivoted on the body, a pump connected with said lever, a reservoir supplying said pump, a brake-cylinder, a brake-beam carrying brake-shoes actuated thereby, springs attached to the body for withdrawing the brake-beam, a valve between the pump and the reservoir, a second valve between the valve and the brake-cylinder, and a releasing-valve under the control of the operator between the brake-cylinder and the reservoir, substantially as described.

In testimony whereof I affix my signature in presence of two witnesses.

LARS G. NILSON.

Witnesses:
HARRY S. FISCHER,
C. H. C. JAGELS.